United States Patent [19]

Hartter

[11] 3,714,222

[45] Jan. 30, 1973

[54] PREPARATION OF DIAMINOMALEONITRILE BY CHEMICAL REDUCTION OF DIIMINOSUCCINONITRILE

[75] Inventor: Donald R. Hartter, Wilmington, Del.

[73] Assignee: E. I. du Pont de Nemours and Company, Wilmington, Del.

[22] Filed: Aug. 3, 1970

[21] Appl. No.: 60,725

Related U.S. Application Data

[63] Continuation-in-part of Ser. No. 745,955, July 19, 1968, Pat. No. 3,551,473.

[52] U.S. Cl. .................................................260/465.5 R
[51] Int. Cl. ............................................C07c 121/20

[58] Field of Search ...................260/465.5, 465.5 R

[56] References Cited

UNITED STATES PATENTS

| | | | |
|---|---|---|---|
| 3,551,473 | 12/1970 | Hartter | 260/465.5 R |
| 3,564,039 | 2/1971 | Webster | 260/465.5 R |

*Primary Examiner*—Joseph P. Brust
*Attorney*—James H. Ryan

[57] ABSTRACT

The process for the production of diaminomaleonitrile (HCN tetramer) by the reduction of diiminosuccinonitrile by certain chemical reducing agents, e.g., hydrogen sulfide or phenylhydrazine, is described.

8 Claims, No Drawings

PREPARATION OF DIAMINOMALEONITRILE BY CHEMICAL REDUCTION OF DIIMINOSUCCINONITRILE

RELATED APPLICATION

This application is a continuation-in-part of my copending application Ser. No. 745,955, filed July 19, 1968, and now U.S. Pat. No. 3,551,473.

BACKGROUND OF THE INVENTION

1. Field of the Invention

This invention relates to, and has as its principal object provision of, the production of diaminomaleonitrile by the reaction of diiminosuccinonitrile with various chemical reducing agents.

2. Relationship to the Prior Art

The prior art, e.g., "The Chemistry of Imines," R. W. Layer, Chem. Rev. 63, 489–510 (1963), gives many examples of the chemical reduction of N-substituted imines.

The complete chemical reduction of an unsubstituted imine is reported by O. Cervinka [Collection. Czech. Chem. Commun. 30, (7), 2484 (1965)], which shows reduction of $C_6H_5(C=NH)R$, [R = $CH_3$, $C_2H_5$, $C_3H_7$, α-naphthyl, o-tolyl and mesityl] with Li-Al(OR')$H_3$ [R' = (−)menthyl and (+)bornyl].

None of the art shows chemical reduction of α-diimines or bis-imines, and both Woodburn and Hoffman [J. Org. Chem. 23, 263 (1958)] and Weidinger and Kranz [Ber. 97, 1599 (1963)] report unsuccessful attempts to reduce oxamidines [R = -NH-alkyl] and oxaldiimidates [R = -O-alkyl]:

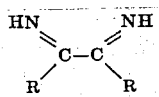

Webster U.S. Pat. No. 3,564,039 discloses the conversion of diiminosuccinonitrile to diaminomaleonitrile by a complex reaction with hydrogen cyanide plus a basic cyanide such as potassium cyanide.

My above-mentioned copending application claims the reduction of diiminosuccinonitrile to diaminomaleonitrile by means of hydrogen in the presence of a Group VIII transition metal hydrogenation catalyst.

DESCRIPTION OF THE INVENTION

It has now been found that diiminosuccinonitrile can be reduced in good yield to diaminomaleonitrile by contact and reaction with certain chemical reducing agents in liquid phase. The reaction reduces the 2-imino groups, in effect by 1,4-addition, according to the following equation:

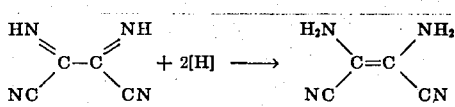

Reducing agents usable include sulfhydryl compounds, e.g., hydrogen sulfide and mercaptans or thiols, borohydrides, e.g., sodium and lithium borohydrides, aluminum hydrides, hydrazines and such materials as diborane, anthracenebiimine, phosphine, triphenyltin hydride, lithium diethoxyaluminum hydride, and dimethyl borane.

As noted, the reaction takes place in liquid phase. The liquid phase may be provided by a wide variety of solvents or diluents that are described below. The principal requirements for the solvents are that they be liquid under the conditions employed and remain inert to the reactants and product. Since the solvents vary somewhat with the reducing agent, they are listed under the specific agents in the examples.

The reaction takes place at a temperature which varies somewhat with the reactants and, hence, is appropriately called an "effective reducing temperature." For all the reducing agents, this range includes from 0° to +25° C. but may vary, even at both ends, according to the agent used. More specific ranges for the various types of reducing agents are as follows:

| Reductant | Broad Temperature Range (° C) | Preferred Temperature Range (° C) |
| --- | --- | --- |
| Sulfhydryl | 0 to 100 | 0 to 50 |
| $NaBH_4$ | −20 to +100 | −20 to +25 |
| $LiAlH_4$ | −50 to +25 | −50 to +25 |
| $C_6H_5N_2H_3$ | −30 to +100 | −30 to +25 |

Pressure is not critical in the invention except to retain a liquid phase. Reaction time is not critical.

EMBODIMENTS OF THE INVENTION

There follow some nonlimiting examples in which the process of the invention is described in more detail. Temperatures are in degrees Celsius, and percentages are by weight, unless otherwise noted.

EXAMPLE 1

Hydrogen Sulfide Reduction of Diiminosuccinonitrile

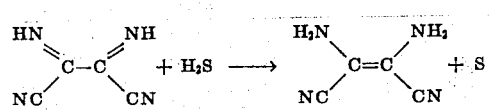

A stream of hydrogen sulfide gas was bubbled through a slurry of 10.0 g (0.094 mole) of diiminosuccinonitrile in 100 ml of methylene chloride. The gas flow was continued for 30 minutes at a rate such that the pot temperature did not go above 40° C. The reaction mixture was filtered to give 9.5 g of tan solid. Removal of the solvent gave another 0.6 g of solid. The 10.1 g of solid was washed with 100 ml of carbon disulfide to remove sulfur and 8.6 g (84 percent) of diaminomaleonitrile was obtained. This material was identified by its infrared spectrum which was identical with that of an authentic sample of diaminomaleonitrile.

EXAMPLE 2

Hydrogen Sulfide Reduction of Diiminosuccinonitrile

A slurry of 10.0 g (0.94 mole) of diiminosuccinonitrile in 150 ml of methylene chloride was cooled to −30°C and hydrogen sulfide gas was bubbled through the slurry for 10 minutes. No reaction occurred until the solution was warmed to above 0° C. Upon warming to room temperature the excess hydrogen sulfide bubbled from the solution. The red precipitate thus formed was collected and recrystallized from 200 ml of water to give 8.1 g (80 percent) of diaminomaleonitrile as a red powder. Further recrystallization from water and treatment with decolorizing charcoal gave 7.1 g of white diaminomaleonitrile, identical to an authentic sample by infrared spectrum. The sulfur formed during the reaction did not dissolve in the water during recrystallization.

EXAMPLE 3

Thiophenol Reduction of Diiminosuccinonitrile

A slurry of 2.0 g. of diiminosuccinonitrile, 4.0 g. of thiophenol (phenyl mercaptan) and 100 ml. of methylene chloride was heated at reflux for 1 hour. The mixture was cooled and 1.0 g. of solid collected on a filter. Infrared analysis showed this to be a mixture of starting material and diaminomaleonitrile. Addition of petroleum ether to the filtrate precipitated 2.1 g. of a red solid that contained additional diaminomaleonitrile as evidenced by the infrared spectrum.

EXAMPLE 4

Ethanethiol Reduction of Diiminosuccinonitrile

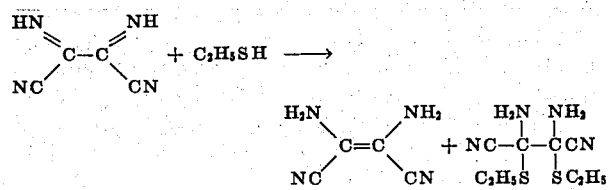

A slurry containing 2.0 g. (0.019 mole) of diiminosuccinonitrile, 4 ml of ethanethiol and 20 ml of methylene chloride was stirred at 26° C for 15 minutes and then refluxed for 30 minutes. The solution was cooled, 75 ml of petroleum ether was added and the resulting mixture was filtered to give 0.9 g (43 percent) of diaminomaleonitrile. Upon standing, 1.0 g (23 percent) of the bis-thiol adduct crystallized as white needles.

Reduction of diiminosuccinonitrile can also be effected by other sulfhydryl compounds. These include arenethiols such as thiophenol, α- and β-naphthalenethiol; alkanethiols such as methyl, ethyl, n- and isopropyl and the butyl mercaptans; alkarenethiols such as o-, m-, and p-cresols and the xylenethiols; and aralkanethiols such as benzyl mercaptan, α- and β-phenylethyl mercaptan, γ-phenylpropyl mercaptan. The lower alkyl mercaptans, i.e., mercaptans containing up to four carbon atoms, are preferred. These reductions can be carried out at temperatures ranging from 0° C. to 100° C., preferably at 0° C. to 50 °C.

The solvent is not critical as long as it is nonreactive with the reductant or with the diiminosuccinonitrile. Even rather poor solvents such as the methylene chloride of Examples 1–3 may be used to form slurries as long as a few percent of the diiminosuccinonitrile is dissolved. A wide variety of lower aliphatic compounds can be employed; these include compounds containing up to and including five carbon atoms and may be selected from the class of alcohols, ethers, ketones, esters, halogen-substituted alkanes, alkyl nitriles, amides and sulfoxides. Specific compounds that are convenient include methylene chloride, the dichloroethanes, tetrahydrofuran, dioxane, N,N-dimethylformamide and dimethylsulfoxide. Benzene and toluene are also useful.

EXAMPLE 5

Sodium Borohydride Reduction of Diiminosuccinonitrile

To a stirred solution of 3.0 g (0.028 mole) of diiminosuccinonitrile in 50 ml of methanol at −20° C was added 1.0 g of $NaBH_4$ in portions. The resulting solution was allowed to warm to 25° C and poured into 200 ml of water. Approximately 75 ml of solvent was removed on a rotary evaporator and the remaining aqueous solution was extracted with two 300-ml portions of ethyl acetate. The combined organic layers were dried over $MgSO_4$ and the solvent was removed to give 2.4 g (79 percent) of light tan diaminomaleonitrile.

Sodium borohydride reductions can be carried out in the lower, i.e., $C_1$–$C_4$, alcohols, water, dioxane, tetrahydrofuran and diethylene glycol dimethyl ether (diglyme). This reduction is preferably carried out at −20° to 25° C. but can be run at higher temperatures that range up to 100° C.

Other alkali metal or alkaline earth metal borohydrides can be used in Example 5. These include beryllium, magnesium, cesium, lithium, sodium and potassium borohydrides. As sodium and potassium borohydrides are most readily available, they are preferred.

EXAMPLE 6

Lithium Aluminum Hydride Reduction of Diiminosuccinonitrile

To a slurry of 1.52 g of $LiAlH_4$ in 100 ml of dry ether was added 2.0 g (0.019 mole) of diiminosuccinonitrile in 200 ml of ether. After the addition was completed, the excess $LiAlH_4$ was destroyed with water and 20 percent NaOH. The resulting dark colored solution was filtered and the ether was removed to give 0.31 g (15 percent) of diaminomaleonitrile.

Lithium aluminum hydride reductions are usually carried out in ether solvents such as tetrahydrofuran, diethyl ether dioxane, 1,2-dimethoxyethane (glyme), 1,2-diethoxyethane, and diethylene glycol dimethyl ether (diglyme). This reduction is most conveniently carried out at ambient temperature but the temperature can range from −50° C. to +25° C.

Any of the alkali metal or alkaline earth metal aluminum hydrides can be used in place of the lithium aluminum hydrides of Example 6. The aluminum hydrides of the alkali metals are most readily available and of these, lithium, sodium, and potassium aluminum hydrides are preferred.

EXAMPLE 7

Phenylhydrazine Reduction of Diiminosuccinonitrile

To a solution of 5.3 g. (0.05 mole) of diiminosuccinonitrile in 100 ml of ethanol and 50 ml of acetonitrile at 0° C was added dropwise 10.8 g (0.10 mole) of phenylhydrazine in 50 ml of ethanol. The solution was allowed to warm to 25° C, stirred for 1 hour and stripped to dryness. The resulting solid was washed with ether and dried to give 3.3 g (61 percent) of diaminomaleonitrile.

The above reduction can also employ other hydrazines such as lower alkyl hydrazines, i.e., hydrazines having up to four carbon atoms, hydrazine and the closely related diimide HN = NH, and these reductions can be carried out at −30° C. to 100° C. A preferred temperature range is −30° to 25° C.

As in other reductions, the solvent is not critical as long as it does not react with diiminosuccinonitrile or hydrazines. Suitable solvents include the lower aliphatic compounds containing up to and including five carbon atoms and selected from the class of alcohols, ethers, esters, halogen-substituted alkanes, nitriles and amides. Specific useful solvents include methanol, ethanol, n- and isopropyl alcohol, the butyl and amyl alcohols, ethyl acetate, dioxane, tetrahydrofuran and glyme.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing diaminomaleonitrile which comprises
    reducing diiminosuccinonitrile
    in liquid phase
    by reaction, at an effective reducing temperature, with
    a reducing agent of the group consisting of
        a. hydrogen sulfide and aliphatic and aromatic hydrocarbylsulfhydryl compounds containing up to 10 carbon atoms;
        b. alkali metal and alkaline earth metal borohydrides;
        c. alkali metal and alkaline earth metal aluminum hydrides; and
        d. hydrazine, diimide and lower-alkyl hydrazines.

2. The process of claim 1 in which the liquid phase is provided by an inert diluent.

3. The process of claim 2 in which the temperature is about 0° to 50° C. and the reducing agent is hydrogen sulfide.

4. The process of claim 2 in which the temperature is about 0° to 50° C. and the reducing agent is thiophenol.

5. The process of claim 2 in which the temperature is about 0° to 50° C. and the reducing agent is ethanethiol.

6. The process of claim 2 in which the temperature is about −20° to 25° C. and the reducing agent is sodium borohydride.

7. The process of claim 2 in which the temperature is about −50° to 25° C. and the reducing agent is lithium aluminum hydride.

8. The process of claim 2 in which the temperature is about −30° to 100° C. and the reducing agent is a phenylhydrazine.

* * * * *